United States Patent
Zoldi et al.

(10) Patent No.: US 10,902,426 B2
(45) Date of Patent: Jan. 26, 2021

(54) MULTI-LAYERED SELF-CALIBRATING ANALYTICS

(75) Inventors: Scott M. Zoldi, San Diego, CA (US);
Jun Zhang, San Diego, CA (US);
Yuting Jia, San Diego, CA (US)

(73) Assignee: Fair Isaac Corporation, Roseville, MN (US)

( * ) Notice: Subject to any disclaimer, the term of this patent is extended or adjusted under 35 U.S.C. 154(b) by 188 days.

(21) Appl. No.: 13/367,344

(22) Filed: Feb. 6, 2012

(65) Prior Publication Data

US 2013/0204755 A1 Aug. 8, 2013

(51) Int. Cl.
*G06Q 20/40* (2012.01)
*G06Q 30/00* (2012.01)
*G06Q 40/02* (2012.01)

(52) U.S. Cl.
CPC ..... *G06Q 20/4016* (2013.01); *G06Q 30/0185* (2013.01); *G06Q 40/02* (2013.01)

(58) Field of Classification Search
CPC . G06Q 20/4016; G06Q 30/0185; G06Q 40/02
See application file for complete search history.

(56) References Cited

U.S. PATENT DOCUMENTS

| | | | | |
|---|---|---|---|---|
| 7,251,624 B1* | 7/2007 | Lee | ............. | G06Q 30/06 705/26.1 |
| 8,027,439 B2* | 9/2011 | Zoldi | ............. | G06Q 40/00 379/114.14 |
| 8,041,597 B2* | 10/2011 | Li | ............. | G06Q 40/02 705/7.38 |
| 10,115,153 B2* | 10/2018 | Zoldi | ............. | G06Q 20/4016 |
| 2008/0077515 A1* | 3/2008 | Zoldi et al. | ............. | 705/35 |
| 2010/0036672 A1* | 2/2010 | Li et al. | ............. | 705/1 |

* cited by examiner

*Primary Examiner* — Ramsey Refai
(74) *Attorney, Agent, or Firm* — Mintz Levin Cohn Ferris Glovsky and Popeo, P.C.

(57) ABSTRACT

This document presents multi-layered, self-calibrating analytics for detecting fraud in transaction data without substantial historical data. One or more variables from a set of variables are provided to each of a plurality of self-calibrating models that are implemented by one or more data processors, each of the one or more variables being generated from real-time production data related to the transaction data. The one or more variables are processed according to each of the plurality of self-calibrating models implemented by the one or more data processors to produce a self-calibrating model output for each of the plurality of self-calibrating models. The self-calibrating model output from each of the plurality of self-calibrating models is combined in an output model implemented by one or more data processors. Finally, a fraud score output for the real-time production data is generated from the self-calibrating model output.

18 Claims, 7 Drawing Sheets

MULTI-LAYERED SELF-CALIBRATING ANALYTICS

TECHNICAL FIELD

The subject matter described herein relates to fraud analytics, and more particularly to multi-layered, self-calibrating analytics and models for detecting fraud in the absence of quality historical data.

BACKGROUND

Increasingly, the need for access to high quality historical data for the development of supervised models becomes a barrier to the development of trained models. The ability to provide fraud detection in some regions relies upon having the ability to learn fraud patterns and variances in production as data is streamed to an online learning model.

In these so-called "self-calibrating models," outlier values of the variables are dependent on the real-time estimation of the variable distributions to determine outliers. Although effective, self-calibrating models are dependent on careful expert design of variables, and inherently utilize a linear score derived from the sum of outlier values across all fraud features.

SUMMARY

This document presents a multi-layered self-calibrating fraud detection modeling methodology that achieves considerable model performance improvement over linear methods of outlier detection. The model architecture which resembles that of a multi-layered neural network model has an advantage of combining of the predictions of multiple self-calibrating models. The multi-layered self-calibrating model leverages factor analysis to overcome input variable selection bias, and each self-calibrating node in the hidden layer is composed of variables from different factor groups. Further, the weight of each hidden self-calibrating nodes can be tuned with limited production data in a supervised training, correlation study, or expert knowledge. Where tuning is not employed, the self-calibrating technology can be used to transform the hidden node outputs to a common scale for use in the output layer to ensure a common score calibration of the hidden node outputs in producing the final output score.

The multi-layered self-calibrating model has the ability to include experimental nodes in the model to explore the effectiveness of new variables and new hidden nodes in the production environment without negatively impacting a base working model. Whenever needed the enhanced variable sets or the new self-calibrating hidden nodes can be turned on in the production model without the need to mature the transaction profiles/scaling parameters.

In one aspect, a method for detecting fraud in transaction data includes the step of providing one or more variables from a set of variables to each of a plurality of self-calibrating models that are implemented by one or more data processors. Each of the one or more variables are generated from real-time production data related to the transaction data. The method further includes the step of processing the one or more variables according to each of the plurality of self-calibrating models implemented by the one or more data processors to produce a self-calibrating model output for each of the plurality of self-calibrating models. The method further includes the steps of combining the self-calibrating model output from each of the plurality of self-calibrating models in an output model implemented by one or more data processors, and generating an output for the real-time production data from the self-calibrating model output, the output representing a score relating to whether the transaction is fraudulent.

In another aspect, a system includes at least one programmable processor, and a machine-readable medium storing instructions that, when executed by the at least one processor, cause the at least one programmable processor to perform a number of operations. In particular, the operations include an operation to execute a plurality of self-calibrating models on one or more variables selected from a set of variables, each of the one or more variables being generated from real-time production data related to the transaction data. The operations further include an operation to produce a self-calibrating model output for each of the plurality of self-calibrating models based on the selected one or more variables, each of the plurality of self-calibrating models using a linear combination of the one or more variables from a set of variables to determine a fraud score that is related to a number and a size of one or more outlier values associated with the one or more variables. The operations further include operations to combine the self-calibrating model output from each of the plurality of self-calibrating models in an output model implemented by one or more data processors, and to generate an output for the real-time production data from the self-calibrating model output, the output representing a score relating to whether the transaction is fraudulent.

In some variations one or more of the following can optionally be included. The selection of one or more selected variables can be based on factor group analysis to minimize correlation among selected variables for each of the plurality self-calibrating models. The one or more outlier values can be based on a real-time computation of variable distributions of the one or more variables, and the one or more outlier values can be updated recursively for each new set of transaction data. In some variations, the operations further include an operation to assign a weight to each self-calibrating model output, and the output model processes the output from each of the plurality of self-calibrating models according to the weight. In yet other variations, the operations include an operation to assign a zero weight to a subset of one or more of the plurality of self-calibrating models to designate the subset as experimental self-calibrating models.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The multi-layered self-calibrating model is effective on real world fraud data. The performance of the multi-layered self-calibrating model and system on out-of-time data can exceed traditional neural network models, and shows large performance improvements over the single layer self-calibrating model. A neural network model and the corresponding variable scaling are fixed after the initial training and the model performance degrades on out-of-time data as fraud patterns change over time, whereas the multi-layered self-calibrating model has the ability to continually adjust the self-calibrating variables, which allows it to adapt to the changes in the out-of-time data and demonstrates little model degradation making it attractive for use in changing environments such as fraud detection problems.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

This document discusses a system and method to achieve very considerable model performance improvement over linear self-calibrating models through the use of multi-layered self-calibrating (MLSC) models. The model architecture of a multi-layered, self-calibrating model resembles that of a neural network model, and provides for combining of predictions of multiple self-calibrating models, in an effect providing 'crowd-speak'. The use of multi-layered self-calibrating models may involve prescriptive variable selection techniques for the hidden nodes in the model In one or more implementations, contrary to a traditional neural network model where the weights are fixed after the initial training, the MLSC model learns and adapts to a constantly changing production environment. The design of the hidden layer nodes (each node a self-calibrating model) is more flexible, adapting, and targeted for the needs of a specific market. MLSC models demonstrate considerable better out-of-time performance allowing for less model degradation and more consistency for operational use primarily due to their adaptive character and lack of reliance on historical data.

Figure 1:
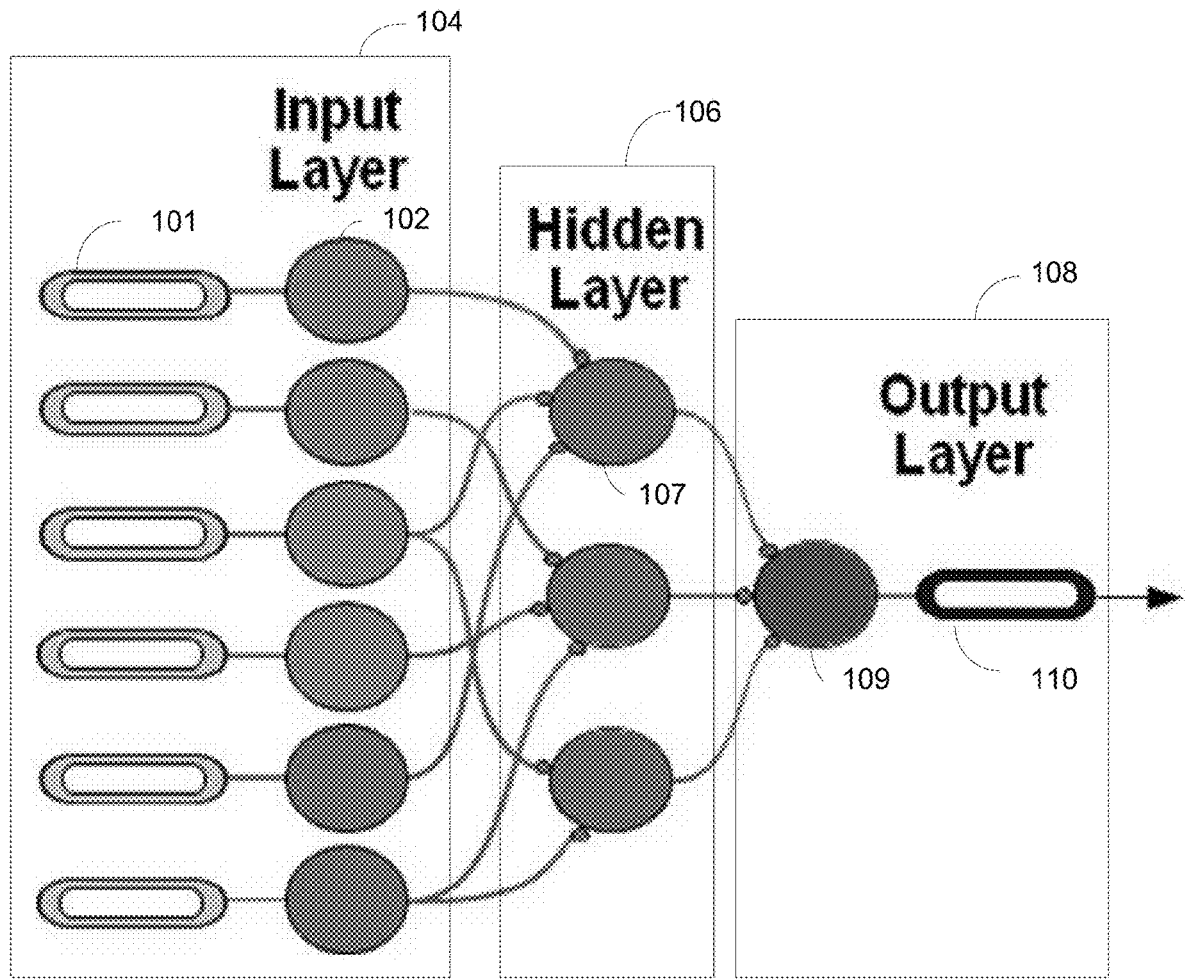
FIG. 1 shows a multi-layered self-calibrating system and model consistent with implementations of the current subject matter.

The multi-layered self-calibrating (MLSC) models include nodes contained in a "hidden" layer of the MLSC model, which are atomic self-calibrating outlier models. FIG. 1 illustrates an MLSC system 100. The MLSC system 100 includes an input layer 104 having a number of input variables 102 based on production environment data feature extractors 101. The input variables 102 are the fraud features on the input layer, and are the variables associated with the fraud detection problem. The MLSC system 100 further includes a hidden layer 106 having a number of hidden layer nodes 107, each of which is a self-calibrating model. The MLSC system 100 further includes an output layer 108 which combines outputs or predictions associated with each of the self-calibrating models of the hidden layer nodes 107 in the hidden layer 106 to deliver an output 109, on which output data 110, such as a score, for example, can be based and used in production.

As described above, a node in the hidden layer may be a self-calibrating model. As such, each node utilizes a linear combination of input variables 102 to determine a fraud score which is related to the number and size of the outliers associated with the variable values 102. The outlier values are determined based on real-time computation of the variable distributions and updated recursively as each transaction is processed by the model. Self-calibrating models in accordance with some implementations are described in U.S. Pat. No. 8,027,439, the contents of which are incorporated by reference herein for all purposes, and are described in further detail below.

Figure 2A:
FIGS. 2A-2B are diagrams illustrating outlier values of a variable and how these values can change due to changing variable dynamics.
Figure 2B:
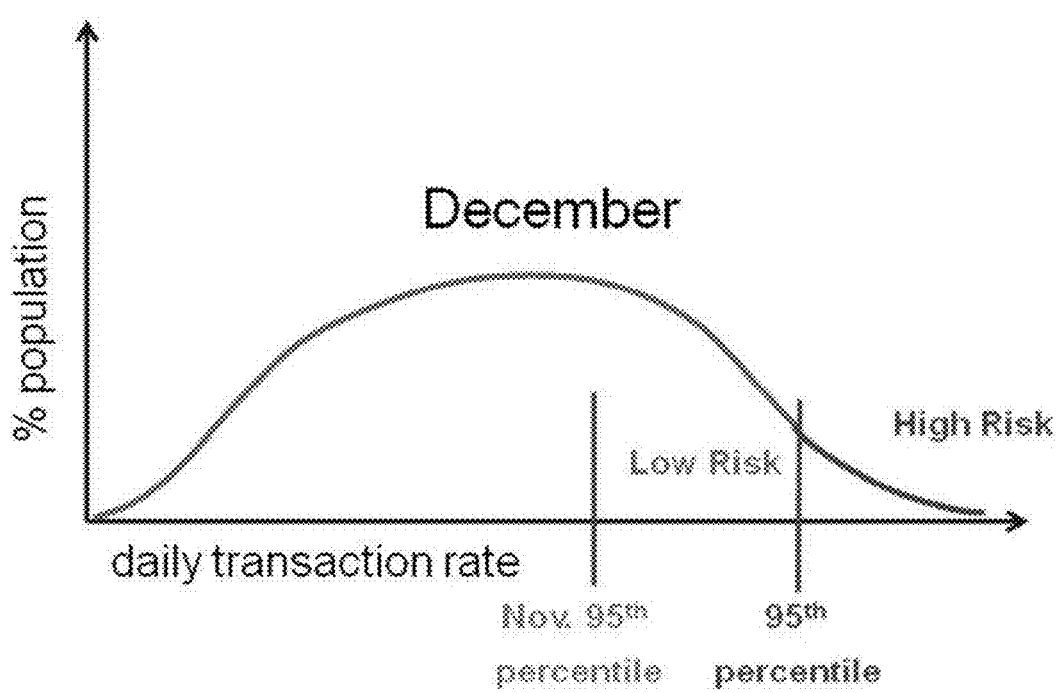

Distributions of fraud variables will change over time in response to fraud actions and changing dynamics of the market. Most drastically this can be seen in emerging payment products or emerging markets where there is a ramping up of acceptance of a particular financial instrument. This is illustrated graphically in FIGS. 2A and 2B which illustrates how over time the outlier values of a variable may change due to changing transaction dynamics. For example, what is illustrated as an outlier value for the daily transaction rate in November in FIG. 2A may not be considered an outlier in December in FIG. 2B based on a changing customer base behavior.

To determine the outlier values, one needs to quantify the point in the distribution of values of the variables where if the variable value exceeded that point it would be considered outlier. In past implementations, the 95% quantile of the distribution has been used to determine the threshold where the value is considered an outlier. We utilize the formula below to use a simple unconditional re-scaling across all independent variables $$q(x_i | \theta) \equiv \frac{x_i - \theta_{i,1}}{\theta_{i,2}} \in [0, C]$$

where $((\theta_{i,1}, \theta_{i,2}) \in \theta)$ are location and scale parameters respectively of the computed distribution of independent variable $x_i$. The scaled value is bounded between 0 and some constant C to protect the analytics from extreme outlier values. Depending on implementation, these distributions are computed in real-time and adjust with at least one transaction processed. Our method is a result of real-time estimates of the scaling parameters $(\theta_1, \theta_2) \in \theta$ using the production data.

For a given variable x, its r-th percentile $\bar{x}^r$ is computed on the fly as the observations of x come in. The online estimation technique works iteratively as follows. One iteration may involve observing M consecutive observations, where $M \geq 1$ is a free parameter. At the n-th iteration, an estimate of $\bar{x}^r$ is updated; denote this estimate by $\bar{n}_n^r$ at the n-th iteration.

Denote the i-th observation in the n-th iteration as $x_n^i$, where i is in [1, M]. At the n-th iteration, a density estimate $f_n$ is computed for the variable x at the r-th percentile using the following equation:

$$f_n = (1 - w_n)f_{n-1} + w_n \frac{\sum_{i=1}^{M} 1\{|x_n^i - \bar{x}_{n-1}^r| \leq c_n\}}{2c_n M}$$

where $1\{\cdot\}$ is an indicator function that takes a first value (e.g., 1) if the condition inside the curly brackets is satisfied, and a second value (e.g., 0), otherwise. The series $w_n$, and $c_n$ may satisfy some convergence criteria. Among many others, one choice is $w_n = 1/n$ and $c_n = 1/\sqrt{n}$.

After $f_n$ is computed, $\bar{x}_n^r$ is obtained as follows:

$$\bar{x}_n^r = \bar{x}_{n-1}^r + w_n \frac{r - \sum_{i=1}^{M} 1\{x_n^i \leq \bar{x}_{n-1}^r\}/M}{e_{n-1}}$$

where $e_n = \max\{f_n, f_0/\sqrt{n}\}$ and $f_0$ is an initial value of $f_n$.

Note in some implementations, $w_n$ may be time decayed as opposed to event decayed. A time decayed version of $w_n$ may be more appropriate for some fraud applications. The technique also has the advantage of handing segmentation in an automated fashion, where, based on segments specified in the streaming data, the outlier values of variables can be determined for different segments by maintaining different quantile estimates based on segments, for example:

a. High amount segment
b. High spender segment
c. Cross-border segment
d. Cash transaction segment
e. Etc.

Utilization of the self-calibrating analytics approach above then may involve recursive estimates of the values of $\theta_{i,1}$ and $\theta_{i,2}$ (here assume two parameters to scale the variables) associated with each of the $x_i$ variables. These $\theta_{i,1}$ and $\theta_{i,2}$ can be computed both overall for all transactions and within specific segments. Examples of fraud detection variables that can be leveraged in these models which involve computation of their outlier values include:

a. Transaction Amount
b. Ratio of Transaction Amount to Daily Average Transaction Amount
c. Card Not Present (CNP) Transaction Amount
d. Ratio of CNP Transaction Amount to Daily Average CNP Transaction Amount
e. Cross Border (CB) Transaction Amount
f. Ratio of Transaction CB Transaction Amount to Daily Average CB Transaction Amount
g. Cash/ATM Transaction Amount
h. Ratio of Transaction Cash/ATM Transaction Amount to Daily Average Cash/ATM Transaction Amount
i. Ratio of Transaction Amount 1 day to 1 week
j. Ratio of Card Not Present Transaction Amount 1 day to 1 week
k. Ratio of Cross Border Transaction Amount 1 day to 1 week
l. Frequency of Transactions
m. Frequency of International Transactions
n. Card Not Present Frequency of Transactions
o. Cross Border Frequency of Transactions
p. Maximum values on purchase/cash/CNP/CB transactions
q. Ratio of current Transaction to the Maximum value
r. Ratio/Frequency of transactions on certain Factor/Visa groups
s. Etc.

Assignment of Input Variables to Hidden Nodes

The hidden layer of the MLSC system represents multiple self-calibrating models. To obtain fraud scores from the multiple hidden layer nodes, at least one node acting as one of multiple observers, different inputs from the input layer are selected or assigned for at least one hidden node to create multiple different self-calibrating models, which are different from one another based on the variables assigned from the input layer.

Figure 3:
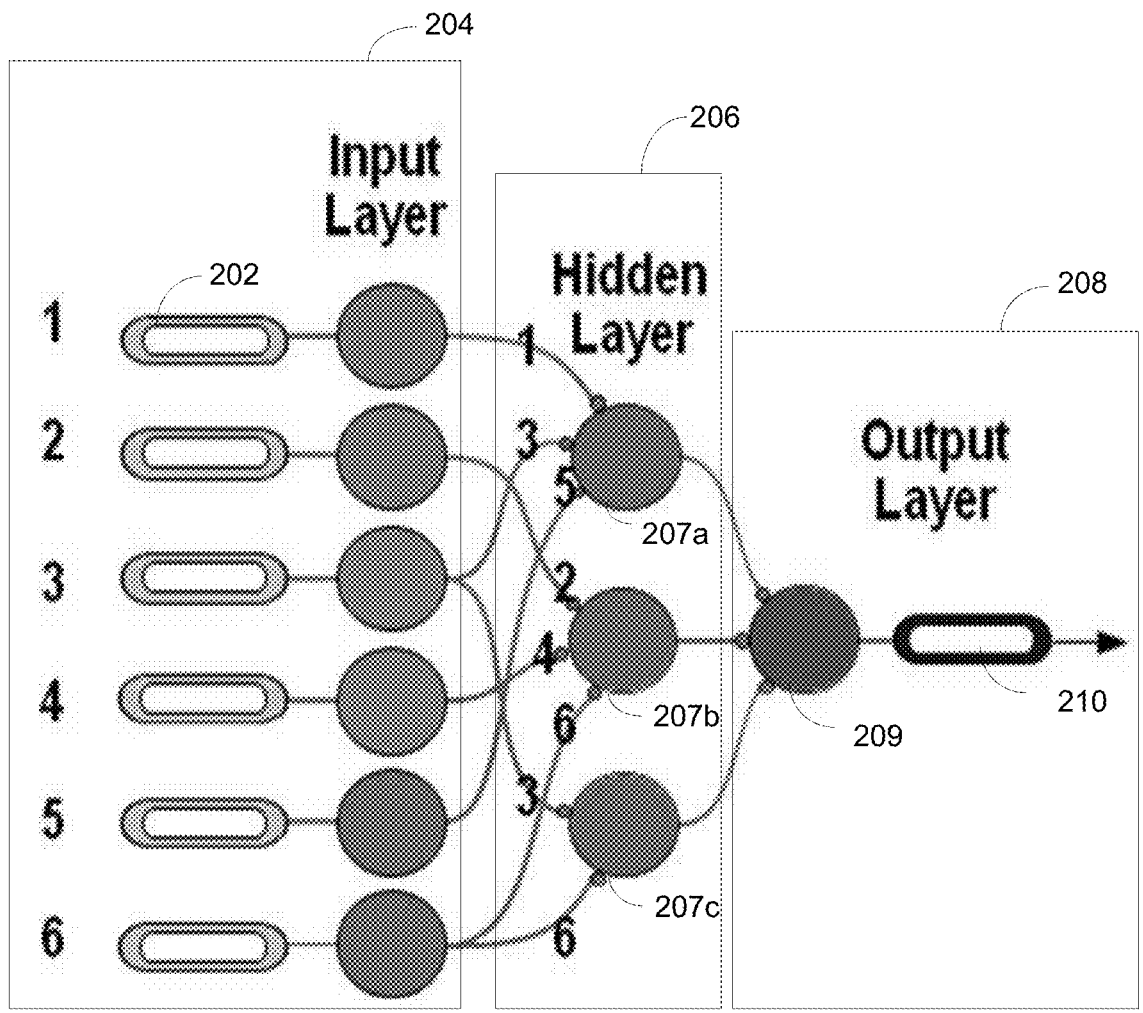
FIG. 3 shows a multi-layered self-calibrating system and model with hidden layer nodes that are derived from different combinations of input variables.

FIG. 3 illustrates an MLSC system 200 having a hidden layer 206 that contains three self-calibrating nodes 207 that utilize different combinations of input variables 202 in the input layer 204, represented as variables 1, 2, 3, 4, 5, and 6. A first self-calibrating node 207a utilizes variables 1, 3, 5, a second self-calibrating node 207b utilizes variables 2, 4, 6, and a third self-calibrating node 207c utilizes variables 3 and 6.

As the number of hidden self-calibrating nodes grows in the hidden layer 206, the MLSC system 200 provides a "crowd speak" of multiple self-calibrating nodes in the hidden layer 206. In some implementations concerning fraud problems, the optimal number of hidden layer nodes 207 is 40-50, and the input layer 204 includes 100 or more input variables.

The selection of what variables are used in a particular hidden node can be assigned randomly or according to a system and method. In some implementations, a method of assigning variable inputs to the self-calibrating nodes is provided. In one or more embodiments, the variable assignment method may not have a node too strongly dependent on another type of fraud feature. As an example, if there are 12 variables related to dollar amount, it is not ideal that a self-calibrating model for fraud detection have too many variables related to dollar amount, or else the node becomes a dollar spend detector versus a fraud detection model. This will cause unnecessary false positives of the overall model score and reduce the effectiveness of the MLSC model.

To overcome possible selection bias in the assignment of variables to hidden nodes, factor analysis is leveraged which groups similarly correlated variables into factor groups of similar variables. This can be done in a multitude of ways utilizing principle component analysis, correlation analysis, mutual information or other techniques. In accordance with the method, the input layer variables are grouped into variable groups of similar types.

Figure 4:
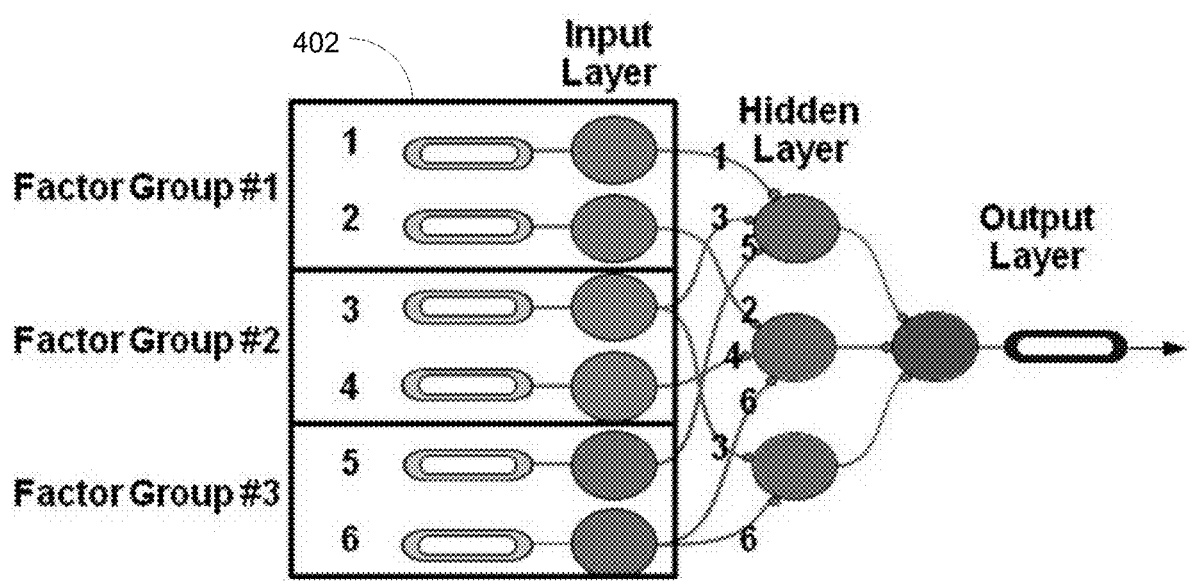
FIG. 4 shows a multi-layered self-calibrating system and model with assigned various factor groups of input variables.

FIG. 4 illustrates an MLSC system 400 having variables arranged and grouped according to a number factor groups 402. Variables 1 and 2 belong to Factor Group #1. Variables 3 and 4 belong to Factor Group #2. Variables 5 and 6 belong to Factor Group #3. The hidden layer nodes then are assigned, randomly or systemically, one or more variables (if any) from each of the number of factor groups 402. FIG. 4 illustrates 6 variables in the MLSC system 400 and three different factor groups 402. The hidden layer of the MLSC system 400 is formed of three self-calibrating nodes, where each node contains one variable (if any) from a factor group. This allows the self-calibrating nodes to not be too strongly biased by one factor group.

Figure 5:
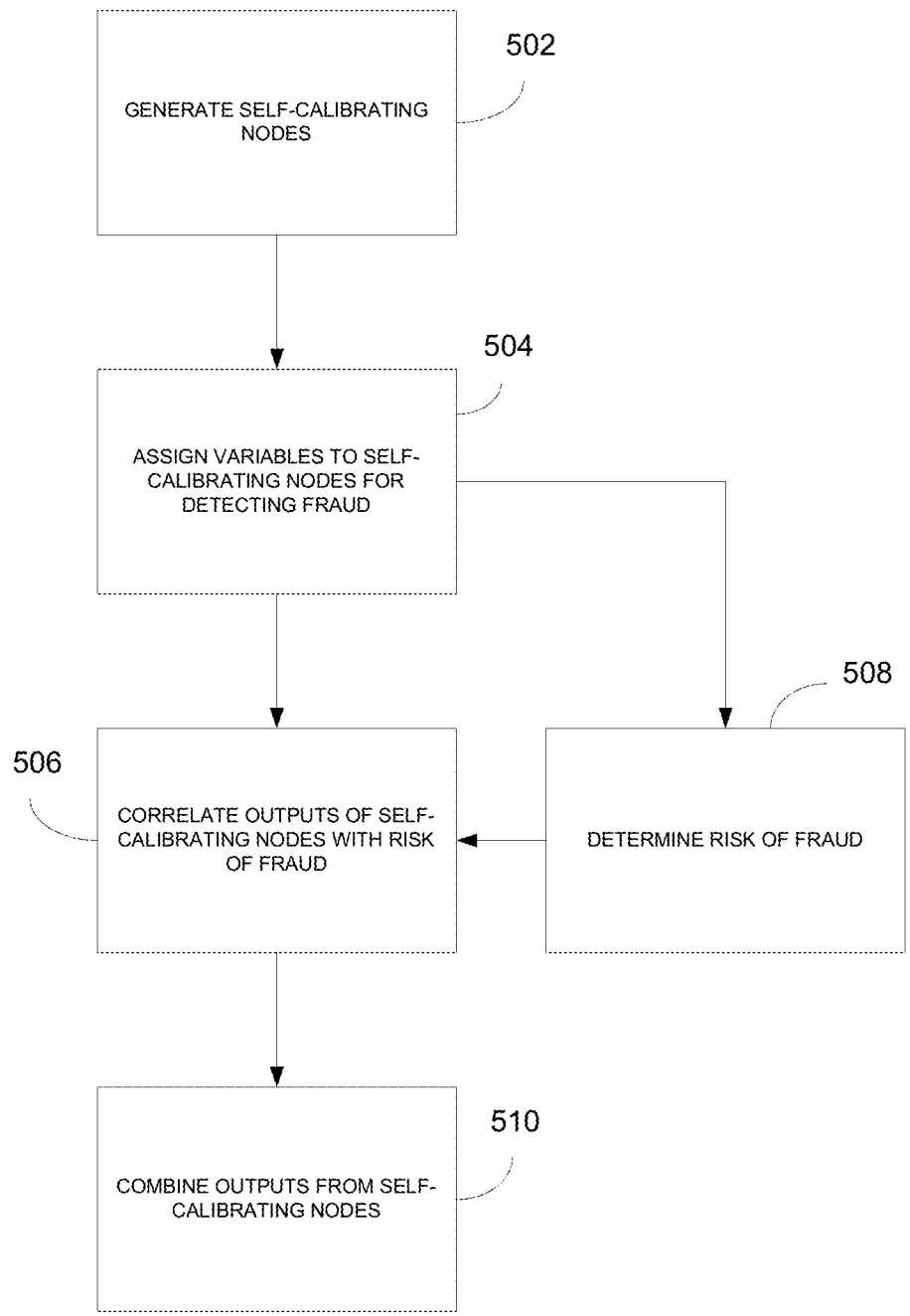
FIG. 5 is a functional flow diagram of a method for correlating outputs of self-calibrating nodes with risks of fraud.

Factor groups 402 may have unequal number of variables, but the methodology of assigning variables to the self-calibrating nodes remains the same. As shown in FIG. 5, a method of assigning variables to self-calibrating nodes of a hidden layer in an MLSC system is shown. At 502, multiple self-calibrating nodes are generated, which are different models for the detecting of fraud through the assignment, at 504, of different variable linkages from the input layer. At 506, the hidden node outputs are correlated to a risk of fraud through determination of the values of the variable linkages 504 and which are outlier based on the self-calibrating analytics real-time updated variable distribution, determined at 508. At 510, the hidden node outputs are combined in the output layer. Accordingly, a combination of these different fraud models is leveraged to improve the accuracy of detection and robustness of the prediction.

Multi-Layered Self-Calibrating Outlier Analytics Output Layer

The MLSC output layer 208 is responsible for assigning the final score related to the risk of fraud. In a no-training data situation, the same self-calibrating analytics technique would be employed to measure the 95% or other outlier value of the score outputs of each of the hidden self-calibrating nodes. This allows for a combination of hidden node scores based on common outlier values, which removes the complication of score calibration.

Other methodologies include assuming similar output distributions from the hidden nodes and uniform weighting of the scores. These have a disadvantage of not properly combining scores on a similar scale, particularly when the models have no data on which to test the assumption of similarly distributed hidden node output values and this approach should be discouraged.

Figure 6:
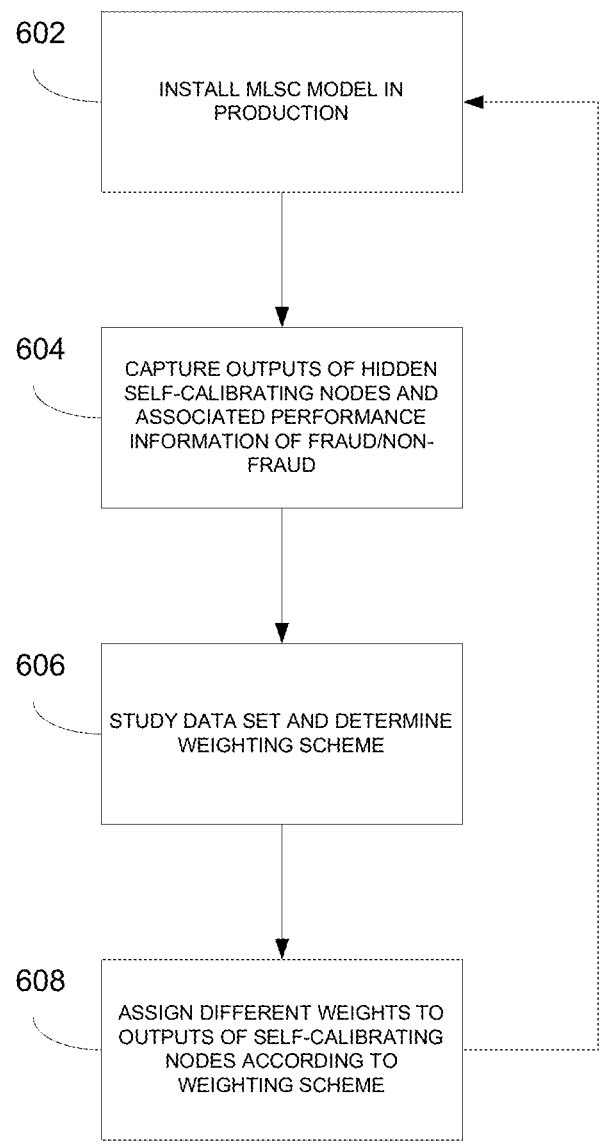
FIG. 6 is a functional flow diagram of a method for determining and assigning a weight to outputs of the self-calibrating nodes of a hidden layer in a multi-layered self-calibrating system.

One exemplary approach is production weights tuning, which occurs after the MLSC model is in production. As illustrated in FIG. 6, at 602 the MLSC model is installed in production, and at 604 the outputs of the hidden self-calibrating nodes and associated performance information of fraud and non-fraud are captured. Then, offline at 606, the data set can be studied. Based on the study, at 608 different weights to each of the outputs of the hidden self-calibrating nodes can be assigned based on correlation analysis or full regression training. This is referred to tuned MLSC models and allows for a supervised training component to be used to enhance the self-learning capabilities in production. The advantage of this approach is that it requires much less data to tune the weights of different nodes or to study the correlation of each hidden node score with the performance tags.

Multi-Layered Self-Calibrating Outlier Analytics Tuning and Optimization

One of the advantages of having historical tagged data to develop models is that it allows the exploration of predictive variables, and to tune the weights of different variables in models. The MLSC model allows for this optimization when used in conjunction with tuning of the output layer weights.

Figure 7:
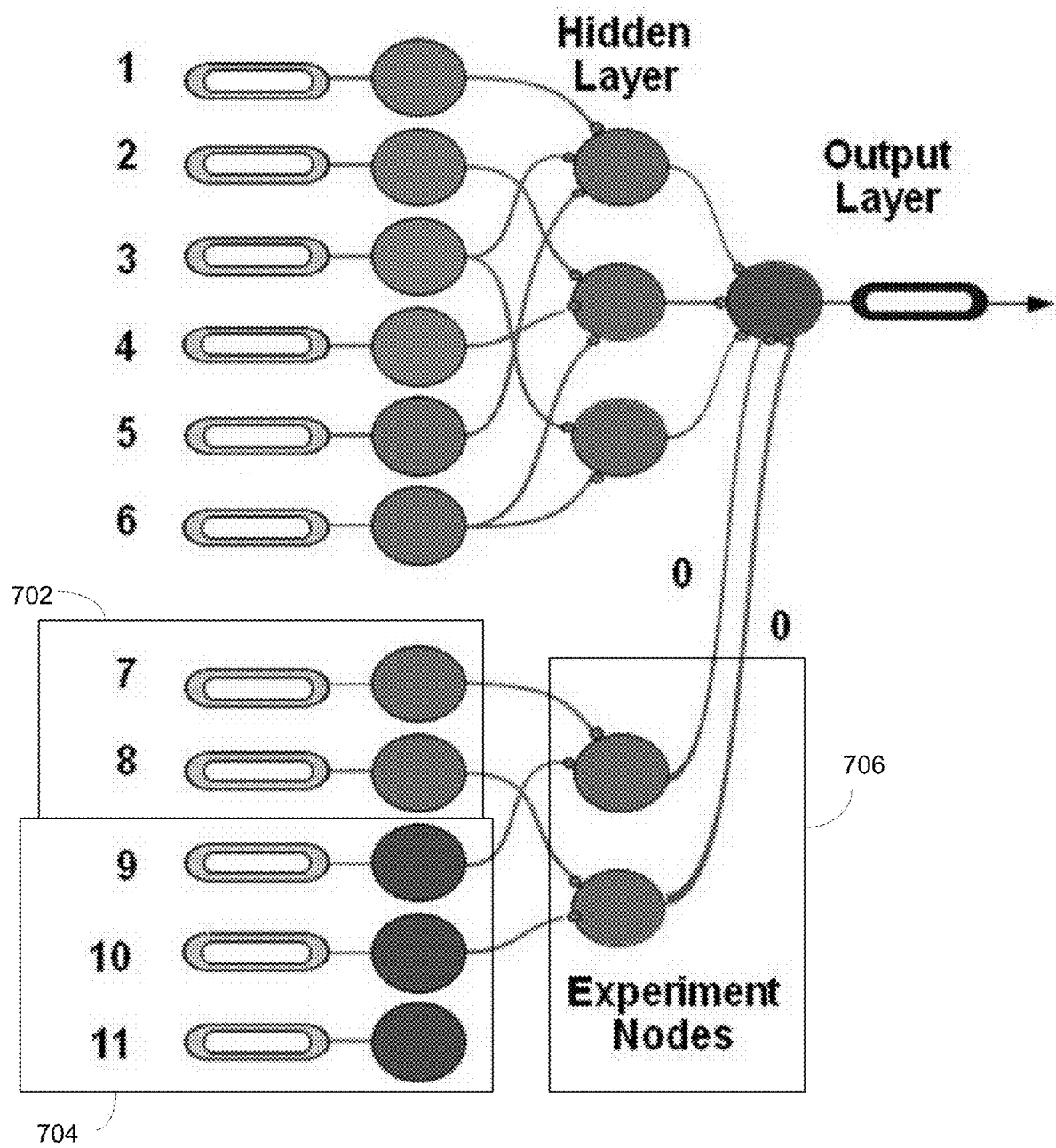
FIG. 7 shows a multi-layered self-calibrating system with experimental nodes in the hidden layer.

FIG. 7 illustrates an MLSC system 700 using experiment nodes in an MLSC model. Entirely new factor groups 702 and 704 in the input layer can be experimented with, and new self-calibrating nodes of the hidden layer can be constructed with an initial zero weight on the output layer. This allows these nodes and subsequently the new input variables/factor groups to be monitored in production as to their effectiveness in correlating with the performance tag.

FIG. 7 illustrates that MLSC models can be configured to have experimental input variables and experimental self-calibrating nodes that be implemented in production models and initially have no contribution to the score. During a tuning exercise, the outputs of these new experimental nodes can be evaluated against performance data in production to determine whether to promote nodes to contribute to the output. Despite FIG. 7 depicting isolated new experimental variables from existing variables, the experimental hidden nodes could include mixes of both existing variables and experimental variables, as long as the output of the experimental hidden self-calibrating nodes have no contribution to the final output score, until the tuning occurs and they are promoted into production. This allows for flexibility to continue to explore and enhance variable sets in production without negatively impacting a base working model based on known effective fraud features on the input layer.

Experiments show that combining the contribution of many self-calibrating nodes in the MLSC model provides a strong model performance lift over traditional self-calibrating models. These same experiments demonstrate that in production on out-of-time data that the MLSC model exceeds the performance of the state of the art trained neural network models. The neural network which is built on historical data shows marked model degradation as fraud patterns change over time. The MLSC model does not show degradation which is expected given that it is not built on historical data and that the model is constantly adjusting to the data that is sent to the model in production. This lack of degradation is an important characteristic of the MLSC model as it allows for more consistency in the expected model fraud detection performance and operational characteristics of the model and lessens the necessity for supporting retrain efforts of supervised models such as neural networks.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A fraud detection surveillance computer-implemented method for determining outlier events in a computing network, the method comprising:
    in a fraud detection computing model comprising a plurality of self-calibrating models:
        providing a first set of one or more variables to a first self-calibrating model;
        providing a second set of one or more variables to a second self-calibrating model,
        the one or more variables being generated from real-time transaction data the values of said one or more variables being associated with one or more transaction-related characteristic used to detect fraudulent transactions;
    producing a first self-calibrating model output based on processing the first set of one or more variables according to the first self-calibrating model;
    producing a second self-calibrating model output based on processing the second set of one or more variables according to the second self-calibrating model; and
    combining the first self-calibrating model output with the second self-calibrating model output to generate an output characterizing whether a transaction associated with the transaction data is fraudulent,
    tuning the first and second self-calibrating model outputs based on a first weight being assigned to the first self-calibrating model output and a second weight being assigned to the second self-calibrating model output,
    the first weight and the second weight calculated and assigned in a non-uniform manner in real-time to respective outputs of the first self-calibrating model and the second self-calibrating model to more efficiently tune weights assigned in the fraud detection computing model,
    the first weight and the second weight being different in value, at least one of the first weight or the second weight being assigned based on correlation analysis or full regression training, and
    supervised training being used to enhance self-learning capabilities of the fraud detection computing model after the fraud detection computing model is in production, thereby requiring a limited amount of data to tune at least one of the first weight or the second weight.

2. The method in accordance with claim 1, wherein the plurality of self-calibrating models are implemented in a hidden layer.

3. The method in accordance with claim 1, wherein assigning a weight to a self-calibrating model output includes assigning a zero weight to a subset of one or more of the plurality of self-calibrating models to designate the subset as experimental self-calibrating model.

4. The method in accordance with claim 1, wherein a linear combination of the one or more variables from a set of variables is used to determine a fraud score that is related to a number and a size of one or more outlier values associated with the one or more variables.

5. The method in accordance with claim 4, wherein the one or more outlier values are based on a real-time computation of variable distributions of the one or more variables.

6. The method in accordance with claim 5, wherein the one or more outlier values are updated recursively for each new set of transaction data.

7. A fraud detection computer-implemented method for detecting fraud in transaction data, the method comprising:
executing, by one or more data processors, a plurality of self-calibrating models based on values assigned to a plurality of variables, at least one of the one or more variables being generated from real-time production data related to the transaction data, at least one of the self-calibrating models being executed on a different set of one or more variables selected from the plurality of variables;
producing a self-calibrating model output for at least two of the plurality of self-calibrating models based on the selected one or more variables, at least one of the plurality of self-calibrating models using a linear combination of the one or more variables from a set of variables to determine a fraud score, according to an unconditional re-scaling across one or more independent variables based on:

$$q(x_i \mid \theta) \equiv \frac{x_i - \theta_{i,1}}{\theta_{i,2}} \in [0, C],$$

where $((\theta_{i,1}, \theta_{i,2} \in \theta)$ are location and scale parameters respectively of a computed distribution of independent variable $x_i$, wherein the fraud score is related to a number and a size of one or more outlier values associated with the one or more variables;
combining values of the self-calibrating model outputs from the at least two of the self-calibrating models in an output model implemented by one or more data processors;
wherein the self-calibrating model outputs are tuned based on weights assigned to the self-calibrating model outputs,
the weights calculated and assigned in a non-uniform manner in real-time to more efficiently tune the weights assigned in the fraud detection computing model; and
generating an output for the real-time production data from the self-calibrating model output of the at least one of the self-calibrating models, the output representing a score relating to whether a transaction associated with the transaction data is fraudulent.

8. The method in accordance with claim 7, wherein the one or more outlier values are based on a real-time computation of variable distributions of the one or more variables.

9. The method in accordance with claim 8, wherein the one or more outlier values are updated recursively for each new set of transaction data.

10. The method in accordance with claim 7, wherein assigning a weight includes assigning a zero weight to a subset of one or more of the plurality of self-calibrating models to designate the subset as experimental self-calibrating models.

11. The method in accordance with claim 7, wherein combining the adjusted values of the self-calibrating models output includes combining a fraud score from at least two of the self-calibrating models to determine a score based on an inputted threshold.

12. A computer-implemented system comprising:
at least one programmable processor; and
a machine-readable medium storing instructions that, when executed by the at least one processor, cause the at least one programmable processor to perform operations comprising:
execute a plurality of self-calibrating models based on values assigned to one or more variables selected from a set of variables, at least one of the one or more variables being generated from real-time production data related to transaction data, at least one of the self-calibrating model being executed on a different set of one or more variables selected from the one or more variables;
produce a self-calibrating model output for at least two of the plurality of self-calibrating models based on the selected one or more variables, at least one of the plurality of self-calibrating models using a linear combination of the one or more variables from a set of variables to determine a fraud score related to a number and a size of one or more outlier values associated with the one or more variables;
combine the self-calibrating model outputs from the at least two of the plurality of self-calibrating models in an output model implemented by one or more data processors, wherein the self-calibrating model outputs are tuned based on weights assigned to at least two of the self-calibrating model outputs,
the weights calculated and assigned in a non-uniform manner in real-time to more efficiently tune the weights; and
generate an output for the real-time production data from the self-calibrating model outputs, the output representing a score relating to whether a transaction characterizing at least a portion of the transaction data is fraudulent.

13. The system in accordance with claim 12, wherein the selection of one or more selected variables is based on factor group analysis to minimize correlation among selected variables for each of the plurality self-calibrating models.

14. The system in accordance with claim 12, wherein the one or more outlier values are based on a real-time computation of variable distributions of the one or more variables.

15. The system in accordance with claim 14, wherein the one or more outlier values are updated recursively for each new set of transaction data.

16. The system in accordance with claim 15, further comprising assigning a weight to at least one self-calibrating model output.

17. The system in accordance with claim 16, wherein the output model processes the output from at least one of the plurality of self-calibrating models according to the weight.

18. The system in accordance with claim 17, wherein assigning a weight to at least one of the self-calibrating model outputs includes assigning a zero weight to a subset of one or more of the plurality of self-calibrating models to designate the subset as experimental self-calibrating models.

* * * * *